United States Patent [19]
Molloy

[11] 3,736,034
[45] May 29, 1973

[54] MEANS TO IMPROVE RETENTION OF ROLLERS IN CAGE

[75] Inventor: Edward W. Molloy, Port Clinton, Ohio

[73] Assignee: General Motors Corporation, Detroit, Mich.

[22] Filed: Aug. 19, 1971

[21] Appl. No.: 173,084

[52] U.S. Cl..............................308/213, 29/148.4 A
[51] Int. Cl................................................F16c 33/64
[58] Field of Search................29/148.4 A; 308/212, 308/213

[56] References Cited
UNITED STATES PATENTS 2,894,791   7/1959   White et al..........................308/212

Primary Examiner—Milton Kaufman
Assistant Examiner—Frank Susko
Attorney—J. L. Carpenter and F. J. Fodale

[57] ABSTRACT

The roller retention in a unit handled "package" roller bearing is improved by bowing the cage cross bars inwardly after snap insertion of the rollers into the cage windows. The bowing moves the cross bar retention edges further inwardly and increases the interference between the cross bars and the rollers.

5 Claims, 5 Drawing Figures

PATENTED MAY 29 1973 3,736,034

INVENTOR.
Edward W. Molloy
BY
F.J. Fodale
ATTORNEY

MEANS TO IMPROVE RETENTION OF ROLLERS IN CAGE

My invention relates generally to unit handled "package" roller bearings with rollers snap retained by a cage, and more specifically, to a method of improving the roller retention in such a bearing and to the bearing with the improved roller retention.

A "package" roller bearing is a generally accepted term in the roller bearing art which describes a unit handled bearing comprising an outer race cup and a complement of rollers which run directly on a rotor when the bearing is applied. "Package" bearings may also include a cage which spaces and retains the rollers which is generally assembled by nesting the cage within the cup and snapping the rollers into the cage windows from the cage interior past retaining edges on resilient cross bars on the cage.

My invention is concerned with improving the retention feature of the cage of a "package" bearing so assembled. Since "package" bearings are assembled to more comprehensive assemblies under factory assembly line conditions, adequate roller retention is a must. It requires little imagination to appreciate the problems created by the "package" bearing coming apart at the assembly line.

The general type of bearing which my invention improves upon is disclosed in the U.S. Pat. No. 2,894,791 which issued to Robert H. White, John H. Cowles and Sidney F. Clark on July 14, 1959, for a Caged Roller Bearing Assembly. In this cage roller bearing assembly, the rollers are retained with an outer race cup by a cage having resilient cross bars with offset center portions to provide retention edges spaced apart less than the diameter of the rollers. The rollers are snapped between adjacent cross bars from the interior of the cage and retained against the interior of the cup to provide the unit handled assembly or "package."

I have found that there is a practical limit on the amount of retention that can be obtained from such a cage. The retention provided by the interference or differences in dimension between the spacing of the retention edges and the roller diameter is a function of the radial distance of the retaining edges on the cross bars from the roller pathway and the resiliency of the cross bars. As this distance is increased, the retaining edges on adjacent cross bars come closer together thereby ostensibly increasing the roller retention provided resiliency is unaffected. I have found, however, the retention increases with increasing distance and interference only up to a point because of the loss of resiliency (elastic deformation) of the cross bars. When the cage bar interference exceeds a certain value, plastic deformation occurs tending to straighten out the drop center cross bars and elongate the cage in the axial direction. For instance, in a bearing having a drawn metal cup and a sheet metal separator of the wound ladder type with uniform cross section cage bars with drop centers for roller retention, the retention reached a limit at about 0.007 inches. The bearing had a pitch circle of about 2 inches, was a little less than an inch in width, and had rollers more than 0.3 inches in diameter. When the cage bars on this earing were designed with roller retention above about 0.007 inches up to about 0.014 inches, any retention above about 0.007 inches was lost when the rollers were snapped into the cage windows. Such roller retention was found to be inadequate in that the rollers often dropped out of the bearing when it was dropped on a factory floor from a height of about 2½ ft. Since the dropping of the bearings can occur often at the factory assembly line, it was determined that the efficiency of the assembly line required sufficient roller retention so that the bearing could be dropped from a height of 6 ft. without the rollers dropping out of the bearing. This in turn required a theoretical retention of at least 0.01 inch which as previously mentioned is beyond the limit provided by snap retention of the rollers alone.

Accordingly, in its broadest aspect, the object of my invention is to provide unit handled roller bearing with sufficient roller retention for efficient use under assembly line conditions.

Another object of my invention is to provide a method of improving the roller retention in a unit handled roller bearing in which the rollers are initially snap retained in the bearing.

Still another object of my invention is to provide a method of improving the roller retention in a unit handled "package" bearing having a sheet metal cage with inwardly offset retaining edges on the cage bars which initially snap retain the rollers.

Still yet another object of my invention is to improve the retention in a "package" roller bearing which includes in its assembly steps, the step of snapping the rollers past the retaining edges on resilient cage cross bars.

These and other objects of my invention will become apparent to those skilled in the art as the disclosure is made in the following detailed description of preferred embodiments of the invention as illustrated in the accompanying sheet of drawings in which.

Figure 1:
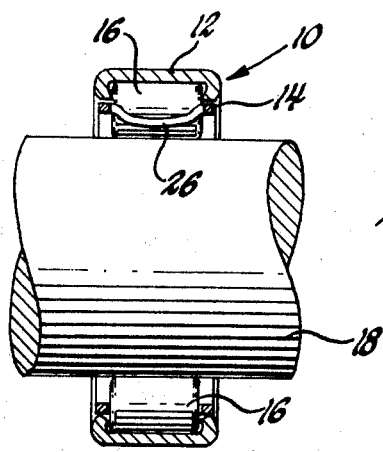
FIG. 1 is a vertical section through a caged "package" roller bearing in accordance with my invention.

Referring now to the drawings and more particularly to FIG. 1, the "package" bearing of my invention is indicated generally at 10. The "package" bearing comprises a unit handled assembly of a drawn metal cup 12, a sheet metal cage 14 and a complement of rollers 16 which run directly on a shaft 18.

Figure 2:
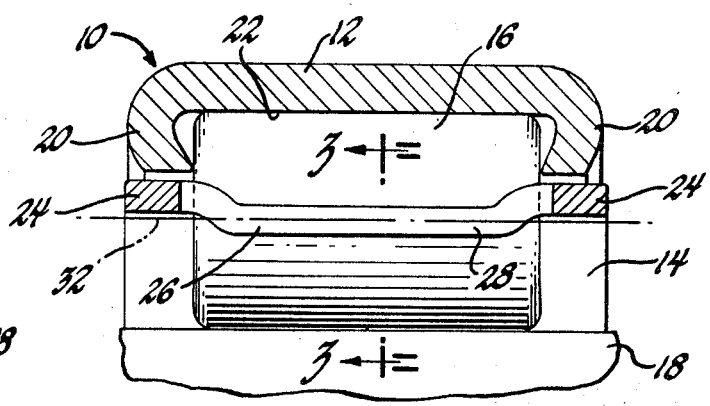
FIG. 2 is a vertical section through a portion of a caged "package" roller bearing showing the bearing prior to its complete assembly in accordance with my invention.

Referring now to FIG. 2, the drawn metal cup 12 includes integral end walls 20 which straddle a roller pathway 22 on the inner surface of the cup 12. It is to be understood that while the cup 12 is drawn metal, it could be the heavier, hardened and ground type outer race. Also, the cup could be of the blind end rather than through straight-through type. That is, one of the walls 20 could be completely closed. The only feature of significance is that the walls 20 whether formed, machined, opened, or closed are an integral part of the cup 12.

The complement of rollers 16 which run directly on the shaft 18 are spaced by the cage 14 which comprises end rings 24 and cross bars 26. The cage 14 is made from a strip of sheet metal stock. Windows are punched in the strip which is wound into a cylinder and the ends butt welded. The cross bars 26 between the windows have offset center portions 28 which may be formed either before or after the strip is wound into a cylindrical cage. Alternately, the cage could be made from tubular stock initially with the windows and offset cross bars being punched and formed as before. The significant feature of the cage is that the cross bars 26 have roller retaining edges 30 located inside the bearing pitch circle 32 which prevent the rollers from dropping out of the cup 12 prior to the assembly of the bearing 10 onto the shaft 18. This retention feature is shown more clearly in FIG. 3 where the roller 16 contacts the cross bar substantially at the pitch circle as indicated at A. Because the roller must move inwardly along a radial line, the point A follows the path 34 which at the inner surface of the cross bar center 28 is at a distance B from the retaining edge 30. The distance B represents one half the interference of the cross bars with the rollers or the roller retention.

Figure 3:
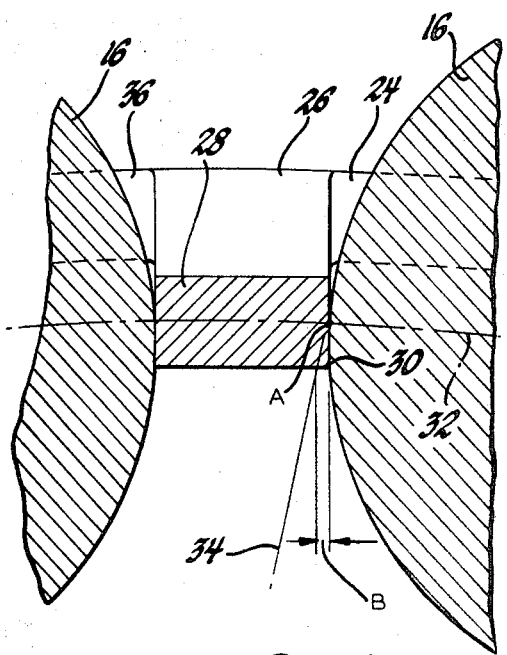
FIG. 3 is a view taken substantially along the line 3—3 of FIG. 2.

The bearing as shown in FIGS. 2 and 3 is assembled in a conventional manner in which the cage 14 is first inserted into the cup 12 with the cage windows 36 aligned with the pathway 22. Rollers 16 are then snapped into the windows 36 past the retaining edges 30 to provide a unit handled "package" bearing. The assembly of the bearing, however, requires a further step because of the aforementioned retention limit.

Figure 4:
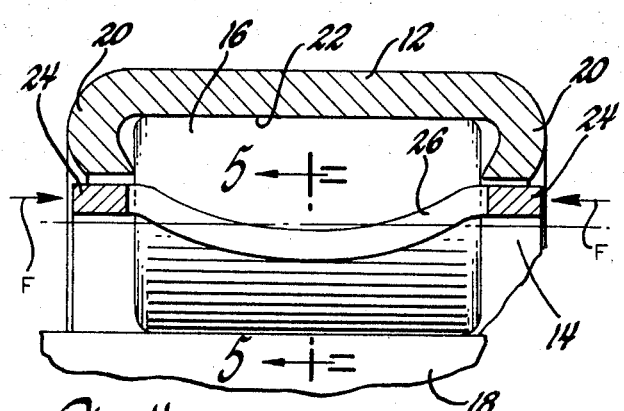
FIG. 4 is an enlarged view of a portion of FIG. 1.

In order to provide sufficient retention, an axial force is applied to each end ring 24 of the cage 14 as indicated by the force arrows F in FIG. 4. This force plastically deforms the cross bars 26 into a slightly bowed shape. The bowing on the cross bar 26 is greatly exaggerated in FIG. 4 for the purpose of visual clarity. In practice, however, the bowing is slight, on the order of one to ten thousandths of an inch for the size of bearings previously referred to. In applying the axial forces F, the distance between the end rings 24 is decreased and may take up the end clearances between the roller ends and the cage windows defined by the inside portion of the end rings. However, spring back of the cage after removal of the forces F provides a sufficient running clearance at the roller ends.

Figure 5:
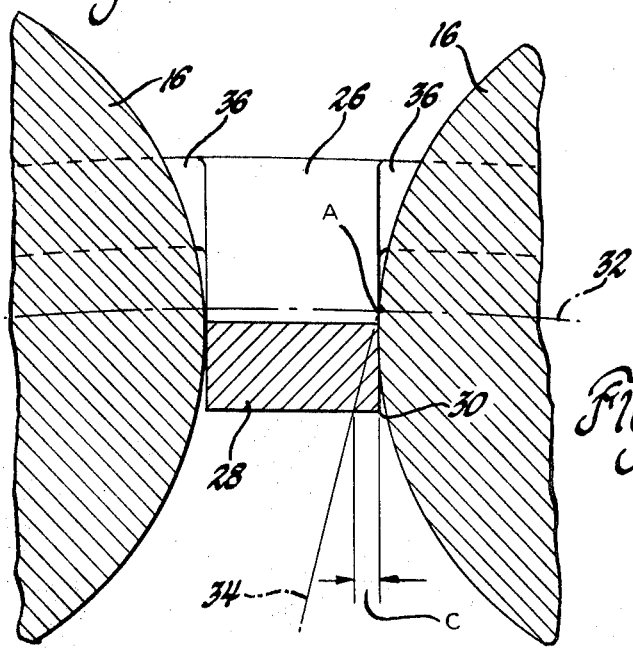
FIG. 5 is a view taken substantially along the line 5—5 of FIG. 4.

The bowing of the cage cross bars 26 moves their center further inwardly as can be seen by comparing the location of the cross bar center portions 28 with respect to the pitch circle 32 in FIGS. 3 and 5. After bowing, the path 34 of the point A intersects the inner surface of the cross bar center at a distance C from the retaining edge 30. The distance C represents the roller retention of my improved bearing which is greater than the retention B and beyond the limit available from a simple snap insertion of the rollers.

Thus I have provided a bearing with sufficient roller retention to meet the needs of factory assembly line conditions. I wish it to be understood that I do not desire to be limited to the exact details of construction shown and described, for obvious modifications will occur to a person skilled in the art.

I claim:

1. The method of assembling a unit handled roller bearing so as to provide improved roller retention comprising the steps of:
   providing a cup having integral radial walls at both ends of the cup, and a roller pathway on the inner surface of the cup between the radial walls,
   providing a resilient, generally cylindrical cage having roller receiving windows defined in the axial direction by portions of end rings and in the circumferential direction by cross bars extending between the end rings, the end ring portions being spaced apart a greater distance than the length of a roller to be received, and adjacent cross bars having roller retaining portions spaced apart slightly less than the diameter of a roller to be received,
   nesting said cage within said cup with said windows aligned with said pathway,
   inserting rollers into said windows from the inside of said cage, adjacent cross bars on said cage elastically deforming to allow said rollers to snap past said roller retaining portions thereon, and
   plastically deforming said cross bars into a slightly bowed shaped concave to said pathway whereby improved roller retention is provided.

2. The method as defined in claim 1 wherein said cross bars are plastically deformed by axially applying an axial load on said end rings until said end rings engage the respective ends of said rollers.

3. The method of assembling a unit handled roller bearing so as to provide improved roller retention comprising the steps of:
   providing a cup having integral radial walls at both ends of the cup, and a roller pathway on the inner surface of the cup between the radial walls,
   providing a resilient, generally cylindrical cage having roller receiving windows defined in the axial direction by portions of end rings and in the circumferential direction by cross bars extending between the end rings, the end ring portions being spaced apart a greater distance than the length of a roller to be received, and adjacent cross bars having roller retaining portions spaced apart slightly less than the diameter of a roller to be received,
   nesting said cage within said cup with said windows aligned with said pathway,
   inserting rollers into said windows from the inside of said cage, adjacent cross bars on said cage elastically deforming to allow said rollers to snap past said roller retaining portions thereon, and
   applying an axial load to said end rings until said cross bars are plastically deformed and the roller retaining portions thereon are located at a slightly greater radial distance inwardly from said pathway whereby improved roller retention is provided.

4. The method as defined in claim 3 wherein said cross bars are of uniform and constant cross section and said roller retaining portions are initially offset inwardly from said end rings and are further offset from said end rings after said cross bars are plastically deformed.

5. A unit handled roller bearing comprising:
   a cup having integral radial walls at both ends of the cup, and a roller pathway on the inner surface of the cup between the radial walls,
   a resilient, generally cylindrical cage having end rings and cross bars,
   a plurality of windows in said cage, said windows being defined in the axial direction by portions of said end rings and in the circumferential direction by said cross bars, and
   rollers snap received in said windows and engaging said pathway between said integral radial walls, said cross bars being of substantially uniform cross section and having a retaining portion thereon extending a major part of the length of said cross bar and spaced from a complementary retaining portion on an adjacent cross bar a distance less than the diameter of said rollers but a distance sufficient to allow passage of a roller therebetween without permanently deforming said cross bar, said cross bars being permanently deformed into a slightly bowed shape concave to said pathway after said rollers are snap received in said windows whereby improved roller retention is provided.

* * * * *